Aug. 3, 1948.  N. S. REYNOLDS  2,446,243
SEAL CONSTRUCTION
Filed April 3, 1943
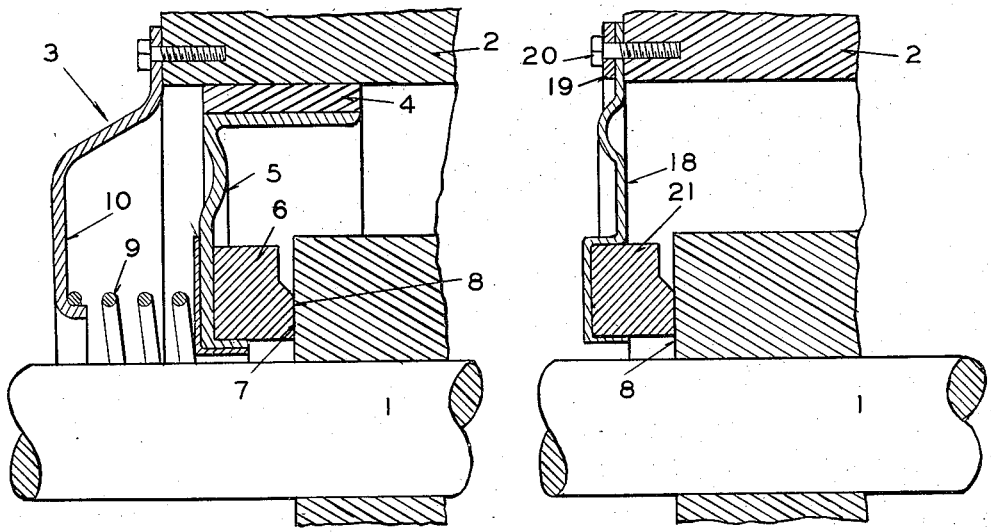
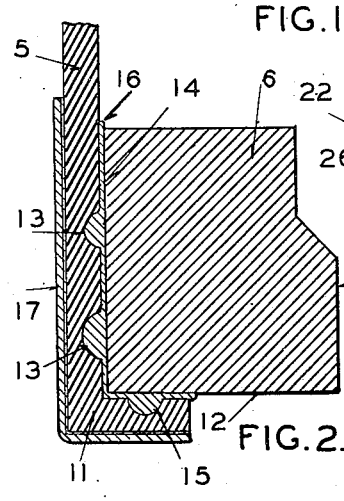
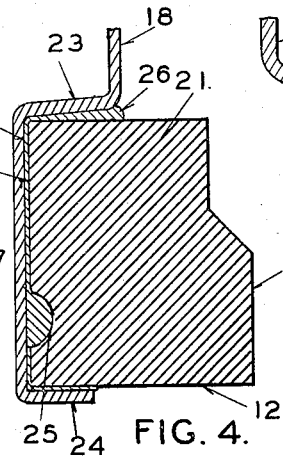
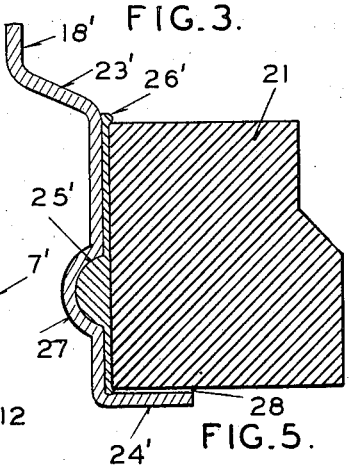
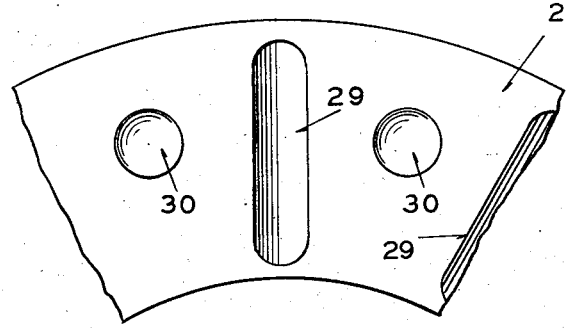
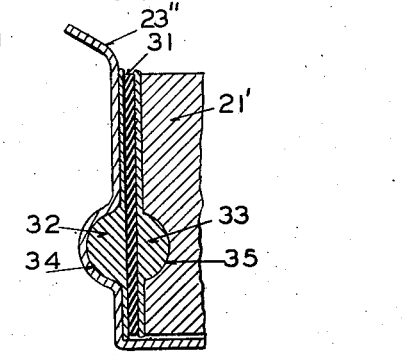
INVENTOR
N. S. REYNOLDS
BY P. N. Lamphere
ATTORNEY Patented Aug. 3, 1948

2,446,243

UNITED STATES PATENT OFFICE 2,446,243

SEAL CONSTRUCTION

Noel S. Reynolds, St. Louis, Mo.

Application April 3, 1943, Serial No. 481,723

5 Claims. (Cl. 286—11)

My invention relates to means for securing together two elements which have different characteristics and is particularly adapted to connect together parts of a seal or like construction.

One of the objects of my invention is to provide improved means for securing together two members having different characteristics.

Another object of my invention is to provide improved means for securing a stable member to another member which is subject to relative movement thereto either as a result of expansion or contraction due to temperature changes or an external force acting thereon.

A more specific object of my invention is to provide improved means for securing a sealing ring of a seal construction to a diaphragm made of either metal or flexible material such as rubber or the like.

Other objects of my invention will become apparent from the following description taken in connection with the accompanying drawings in which Figure 1 is a sectional view of part of a seal construction employing a diaphragm of flexible material and having embodied therein my invention for securing a sealing ring thereto; Figure 2 is an enlarged sectional view showing the bonding connecting means between the ring and diaphragm; Figure 3 is a sectional view similar to Figure 1 but showing a seal construction embodying a metal diaphragm; Figure 4 is an enlarged sectional view of the bonding connecting means between the ring and metal diaphragm; Figure 5 is a sectional view similar to Figure 4 but showing a slightly different construction; Figure 6 is an end view of a sealing ring showing different types of recesses which can be employed to receive a body of the bonding material; and Figure 7 is a sectional view of still another different construction.

Referring first to Figures 1 and 2, numeral 1 indicates a rotatable shaft extending through a housing or support 2 and with which is associated a sealing construction embodying my invention and generally indicated by the numeral 3, said seal construction preventing liquids, such as grease or oil, from passing between the shaft and support. The seal construction has an outer shell or ring 4 shown as having a press-fit in the opening of the support through which the shaft extends. Secured to this shell by any suitable means is a flexible diaphragm 5 which may be made of rubber, synthetic rubber, or the like. The inner portion of the diaphragm carries a sealing ring 6 which may be made of carbon, bronze, or synthetic rubber, or the like. This sealing ring has a smooth end surface 7 for sealing engagement with a smooth annular shoulder surface 8 rotatable with the shaft. Pressure contact between surfaces 6 and 7 is maintained by a coil spring 9 surrounding the shaft and interposed between the inner portion of the diaphragm carrying the sealing ring and a plate 10 secured to the support 2.

As is well known, no simple and practical means has been found for uniting the sealing ring to a flexible diaphragm so that the two members will form a durable unitary assembly throughout the life of the seal. Cements, adhesives, and other bonding substances have been tried but none of these have shown the desired durability as the flexing of the diaphragms caused by shaft movement soon breaks the union, it being apparent that the flexing or stretching of the diaphragm will cause relative movement thereof with respect to the rigid relatively stable material forming the sealing ring.

I have discovered that a direct union of the diaphragm and sealing ring can be simply and practically accomplished by employing a proper bonding material and so associating it with the flexible diaphragm that the flexing or stretching of the material of the diaphragm causing relative movement thereof with respect to the ring will be dissipated through a substantial body of the bonding material which will have such bond to the material of the rigid sealing ring as to be stronger than the bonding material itself.

Referring now to Figure 2, the inner portion of the diaphragm to which the sealing ring 6 is attached is formed with an annular axially extending flange 11 which extends adjacent the inner cylindrical surface 12 of the ring in order to give a support for said ring. The diaphragm is formed with recesses 13 in its surface which is adjacent the rear surface 14 of the sealing ring. These recesses are preferably in the form of annular grooves and are shown as two in number. The number may be greater or less and they may be other than annular grooves. An annular groove 15 is also shown as provided in the surface of flange 11 adjacent surface 12 of the sealing ring. With this construction of the diaphragm, the sealing ring and diaphragm are united by a thermo-setting bonding material 16 as, for example, a plastic having a phenol-formaldehyde base or a synthetic rubber which has a low absorption characteristic. This bonding material is in an original liquid state and is placed on the diaphragm surface and in recesses 13 and 11 and also, if desired, on surfaces 14 and 12 of the sealing ring. The diaphragm and sealing ring are then pressed together.

In order that the diaphragm on the side opposite ring 6 will be supported and restricted against stretching or flexing away from ring surface 14 and to also provide a rigid surface against which one end of spring 9 can abut, there is provided a rigid annular plate 17 having a flange overlying flange 11 of the diaphragm. This plate may be made of metal or of moulded plastic material. The plate is mounted on the diaphragm as shown after thermo-setting bonding material is placed on the adjacent surfaces.

With all the parts assembled as described and shown and having the liquid thermo-setting plastic material between the surfaces to be joined, the parts are suitably held pressed together and the assembly subjected to heat. This will cause a setting of the thermo-setting bonding material and the material will be bonded to the sealing ring and the diaphragm and to plate 17 and the diaphragm.

Among the purposes of recesses 13 and 15 in the diaphragm is that to place a substantial body of bonding material at one or more places between the diaphragm and the sealing ring to thereby increase its mechanical strength and prevent breaking of the bonding material itself. The recesses provide means for confining this substantial body of bonding material and insuring that it will be at the proper place between the diaphragm and sealing ring. If no recesses were employed, the bonding material would be only a thin sheet between the diaphragm and an insufficient body would be present to give the desired strength. The large body of bonding material also takes up or absorbs the stretching of the diaphragm. With a thin sheet of bonding material such cannot have body enough to do sufficient "flowing" to absorb the stretching of the diaphragm material and consequently the bonding material will break. By providing a substantial body of bonding material, the portion of the body joined to the diaphragm can move sufficiently relatively to the portion of the body joined to the sealing ring that no breaking of the bonding material will take place. This relative shifting of the parts of the bonding material or "flow" permits the required relative movement between the adjacent surfaces of the diaphragm and ring due to the diaphragm stretching or flexing and without any shearing of the bonding material. Another advantage of the recesses, especially in connection with a flexible diaphragm, such as rubber or synthetic rubber, is the locking action. The thermo-setting bonding material will bond better to the ring than to the diaphragm. Thus with the ridges of bonding material in the diaphragm recesses, the diaphragm will be "locked" against appreciable shifting relatively to the ring. The plate 17 also aids in confining any movement of the diaphragm to be against the ridges of bonding material.

Referring now to Figures 3, 4, and 5, I have shown a seal construction wherein the diaphragm is made from relatively rigid material such as metal and having secured thereto the sealing ring by means of a union construction embodying my invention. As shown in Figure 3, the diaphragm 18 is secured to support 2 by means of a plate 19 and screws 20. The diaphragm carries a sealing ring 21 which surrounds shaft 1 and has its sealing surface 7' held in pressure engagement with the shoulder surface 8 on the shaft by the resilient action of the diaphragm.

The inner portion of diaphragm 18 is provided with an annular trough 22 formed by an offset portion 23 and a flange 24. The radial width of this trough is slightly greater than the radial thickness of sealing ring 21 in order that the ring may be received in the trough. The surface of the sealing ring adjacent the bottom of the groove is provided with an annular recess 25 which is preferably axially opposite the sealing surface 7' which cooperates with the shaft shoulder surface 8. The sealing ring is secured to the bottom and side walls of trough 22 by the thermo-setting bonding material 26 of the same type as that employed in the seal construction of Figures 1 and 2. The joint is formed by placing the bonding material in the trough and on the sealing ring surface or on the sealing ring surface alone and then the sealing ring pressed into the trough and held therein under pressure during the application of heat to set the bonding material. The groove 25 in the recess provides for a substantial body of bonding material between the bottom of the trough of the diaphragm and the sealing ring, thus producing the proper mechanical strength for the bonding joint.

Since the material of the sealing ring has very little expansion under heat in comparison with the metal diaphragm, the body of bonding material in recess 25 will have the additional function of permitting the greater expansion and contraction of the diaphragm material during temperature changes without breaking the bonding material. As the metal of the diaphragm tends to move relatively to the adjacent surface of the sealing ring, the large body of bonding material in groove 25 will have such "flow" that the bonding material will not be severed or broken. The result is a strong union between the seal and the diaphragm which has been found to be desirable. The action of the bonding material is the same for both metal and flexible diaphragms, notwithstanding in one instance the diaphragm is caused to have relative movement with respect to the sealing ring by stretching or flexing, whereas in the other instance the relative movement is brought about by expansion and contraction due to temperature changes. The offset portion 23 between the main body of the diaphragm 18 and the inner portion permits the yielding of the material of the diaphragm at this point and thus when the seal is subjected to a change in temperature, the expansion of the main body will not be transmitted to the portion of the diaphragm forming the bottom of the groove due to the yielding of this offset portion. Thus relative movement between the diaphragm and the sealing ring will be, for all practical purposes, only that caused by the expansion and contraction of the metal portion of the diaphragm forming the bottom of trough 22. The offset portion 23 also prevents forces caused by flexing of the main body of the diaphragm from being transmitted to the bonding material and causing breaking thereof.

In Figure 5 there is shown a slight modification of the structure shown in Figure 4. In the modified structure the offset portion 23' of diaphragm 18' extends away from sealing ring 21. Also, instead of having the annular groove in the sealing ring for establishing a substantial body of bonding material, the diaphragm is provided with an annular corrugation 27 to establish the annular groove 25' in the diaphragm. The sealing ring is joined to the diaphragm by the thermo-setting bonding material 26'. It may not be necessary to use bonding material between flange 24' and the sealing ring but when such is not done, it is necessary that a slight space, such as indicated at 28, be left between the sealing ring and the flange to permit free movement of the flange during expansion and contraction of the metal diaphragm during temperature changes. When bonding material is used, it permits sufficient expansion as it is not set under pressure at this point.

It is also not necessary that the grooves in either the diaphragm or the bonding material be annular grooves. The only requisite to make a durable union between the sealing ring and the diaphragm is the employment of a substantially large body of bonding material which will be properly confined and maintained during the bonding operation. Figure 6 shows radial grooves 29 and circular recesses 30 which can be substituted for the annular grooves 25 in the surface of sealing ring 21. The radial grooves and circular recesses may be used in conjunction with each other or separately and either or both may be used in conjunction with annular grooves. The radial grooves may be found to be very useful in a sealing construction wherein there is considerable torque applied to the sealing ring. A large body of bonding material in a radial groove will prevent a turning force on the ring from breaking the bond.

In Figure 7 a modified construction is shown which is especially adapted for use where a seal is subject to high temperatures. Under such conditions the expansion of the metal diaphragm may be so great with respect to the ring that the substantial body of thermo-setting bonding material will be broken. To permit more "give" at the joint and thus accommodate the relative movement of the diaphragm, a thin annular member 31 of yieldable material, such as rubber or synthetic rubber, is interposed between the diaphragm 23" and ring 21'. Thermo-setting bonding material 32 bonds the one surface of member 31 to the diaphragm and other thermo-setting bonding material 33 bonds the other surface of member 31 to the ring. Recesses 34 and 35 can also be provided in the attaching surfaces of the diaphragm and the ring, respectively, in order to further strengthen the bonding material and aid in accommodating the relative movement of the diaphragm and the ring due to the temperature changes without breaking the bonding material.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a joint construction for attaching a member of relatively stable material to a member made of natural or synthetic rubber, said joint construction being associated with planular surfaces of said members and comprising a recess in the surface of the rubber member to which is to be attached an adjacent surface of the other member and thermo-setting bonding material filling the recess and being bonded to the surface thereof, the surface of the rubber surrounding the recess and to the adjacent surface of the other member, said recess being of such depth that a substantial body of the thermo-setting bonding material is interposed between the members.

2. In a joint construction for attaching a member of relatively stable material to a member of yieldable and flexible material, said joint construction comprising a recess in the surface of the member of yieldable and flexible material, thermo-setting bonding material bonded to the surface of the recess and the adjacent surface of the member of stable material, and a relatively rigid plate adhered to the surface of the member of yieldable and flexible material on the side opposite the other member.

3. In a diaphragm seal construction, a diaphragm of yieldable and flexible material, a sealing ring of relatively stable material, means for attaching a surface of the ring to a surface of the diaphragm and comprising a recess in the diaphragm surface and thermo-setting bonding material positioned in the recess and being bonded to the surface of the recess and to the adjacent surface of the ring, and a plate of relatively rigid material adhered to the diaphragm on the side opposite the surface to which the ring is attached.

4. In a diaphragm seal construction, a diaphragm of yieldable and flexible material having a ring attaching surface at substantially right angles to its axis and an axially extending flange, said attaching surface and flange being provided with recesses, a sealing ring of relatively stable material, and means for attaching a surface of the ring to the diaphragm attaching surface and the flange and comprising thermo-setting bonding material interposed between all adjacent surfaces of the diaphragm and ring, filling said recesses and being bonded to all contacted surfaces.

5. In a diaphragm seal construction, a diaphragm of yieldable and flexible material having a ring attaching surface at substantially right angles to its axis and an axially extending flange, said attaching surface and flange being provided with recesses, a sealing ring of relatively stable material, means for attaching a surface of the ring to the diaphragm attaching surface and the flange and comprising thermo-setting bonding material interposed between all adjacent surfaces of the diaphragm and ring, filling said recesses and being bonded to all contacted surfaces, and a plate of relatively rigid material adhered to the diaphragm on the side opposite the attaching surface and having a flange overlying the flange on the diaphragm.

NOEL S. REYNOLDS.

REFERENCES CITED

The following references are of record in the file of this patent:

UNITED STATES PATENTS

| Number | Name | Date |
|---|---|---|
| 1,565,532 | Tupper | Dec. 15, 1925 |
| 1,789,978 | Hull | Jan. 27, 1931 |
| 2,021,571 | Victor et al. | Nov. 19, 1935 |
| 2,237,494 | McCormack | Apr. 8, 1941 |
| 2,249,930 | Bailey et al. | July 22, 1941 |
| 2,294,105 | Wallgren | Aug. 25, 1942 |
| 2,308,114 | Schjohn | Jan. 12, 1943 |
| 2,331,054 | Shively | Oct. 5, 1943 |

FOREIGN PATENTS

| Number | Country | Date |
|---|---|---|
| 486,697 | Great Britain | 1938 |